(12) United States Patent
Kaji et al.

(10) Patent No.: US 11,106,204 B2
(45) Date of Patent: Aug. 31, 2021

(54) VEHICLE DRIVING STATE CONTROL DEVICE WITH DRIVER CONTROL PREFERENCE SETTINGS

(71) Applicant: HONDA MOTOR CO., LTD., Tokyo (JP)

(72) Inventors: Toshiyuki Kaji, Wako (JP); Yoshifumi Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 259 days.

(21) Appl. No.: 16/289,912

(22) Filed: Mar. 1, 2019

(65) Prior Publication Data

US 2019/0271980 A1 Sep. 5, 2019

(30) Foreign Application Priority Data

Mar. 2, 2018 (JP) .............................. JP2018-037705

(51) Int. Cl.
*G05D 1/00* (2006.01)
*G05D 1/02* (2020.01)

(52) U.S. Cl.
CPC ......... *G05D 1/0061* (2013.01); *G05D 1/0223* (2013.01); *G05D 1/0246* (2013.01); *G05D 1/0257* (2013.01)

(58) Field of Classification Search
CPC .. G05D 1/006; G05D 1/00223; G05D 1/0061; B60W 60/005; G02B 2027/0196; B60R 2300/80
See application file for complete search history.

(56) References Cited

U.S. PATENT DOCUMENTS

| 2016/0311323 | A1* | 10/2016 | Lee ........................ B60K 35/00 |
| 2017/0057520 | A1* | 3/2017 | Letwin .................. G05D 1/0061 |
| 2018/0208211 | A1* | 7/2018 | Chiba .................... B60W 50/08 |
| 2018/0239352 | A1* | 8/2018 | Wang ................... B60W 30/182 |
| 2019/0128408 | A1* | 5/2019 | Kishi ................... F16H 61/0213 |
| 2020/0108722 | A1* | 4/2020 | Volkmar ................... B60L 7/26 |

FOREIGN PATENT DOCUMENTS

| DE | 102013222048 | * | 4/2015 | ............ B60W 50/08 |
| JP | 2015-110417 A | | 6/2015 | |

* cited by examiner

*Primary Examiner* — Russell Frejd
*Assistant Examiner* — Kenneth M Dunne
(74) *Attorney, Agent, or Firm* — Carrier Blackman & Associates, P.C.; Joseph P. Carrier; Jeffrey T. Gedeon

(57) ABSTRACT

A vehicle control device is equipped with a state control unit adapted to perform a state transition control in which there are combined plural types of travel states in accordance with a travel control mode, and plural types of assist states in accordance with a driving assist mode. Under a sports mode (second travel state) in which a preference of the driver for manual driving is strong, as compared with a normal travel mode (first travel state), the state control unit suppresses a transition from a manual driving state (first assist state) to a normal automated driving state (second assist state) in which a level of driving assistance is high.

8 Claims, 5 Drawing Sheets

T1: NORMAL TRAVEL MODE ON → ON (SPORTS MODE OFF → OFF)
T2: SPORTS MODE OFF → ON
T3: SPORTS MODE ON → ON (NORMAL TRAVEL MODE OFF → OFF)
T4: SPORTS MODE ON → OFF
T5: AD START REQUEST
T6: AD END REQUEST
T7: OCCURRENCE OF CRISIS
T8: CRISIS AVOIDANCE
T9: OCCURRENCE OF CRISIS
T10: CRISIS AVOIDANCE
T11: OCCURRENCE OF CRISIS
T12: CRISIS AVOIDANCE

NORMAL TRAVEL MODE + MANUAL DRIVING STATE

FIG. 4B

SPORTS MODE + MANUAL DRIVING STATE

VEHICLE DRIVING STATE CONTROL DEVICE WITH DRIVER CONTROL PREFERENCE SETTINGS

CROSS-REFERENCE TO RELATED APPLICATION

This application is based upon and claims the benefit of priority from Japanese Patent Application No. 2018-037705 filed on Mar. 2, 2018, the contents of which are incorporated herein by reference.

BACKGROUND OF THE INVENTION

Field of the Invention

The present invention relates to a vehicle control device which is configured to be capable of executing a driving assist for the purpose of assisting a travel control of a host vehicle.

Description of the Related Art

Conventionally, a technique (an automated driving technique or a driving assist technique) for assisting a travel control of a host vehicle has been developed.

In Japanese Laid-Open Patent Publication No. 2015-110417, a driving assist device is proposed in which, with respect to a driver having a high level of driving skill, an assist amount is corrected in accordance with an estimated state of the driver (for example, an emotion of the driver such as anxiety, boredom, pleasure, or the like), and using the corrected assist amount, a driving assist such as assistance with parking or the like is carried out. With respect to a driver having a low level of driving skill, it is stated that a predetermined driving assist is forcibly executed, without correcting the assist amount in accordance with the emotion of the driver.

SUMMARY OF THE INVENTION

Incidentally, according to the driving assist device proposed in Japanese Laid-Open Patent Publication No. 2015-110417, there is a problem in that, concerning a driver having a low level of driving skill, the predetermined driving assist is forcibly carried out without the intention of the driver, and as a result, the driver cannot enjoy driving by herself and becomes dissatisfied.

The present invention has been devised in order to solve the aforementioned problem, and has the object of providing a vehicle control device which is capable of executing a driving assist in which the driving intention of the driver is accurately reflected.

A vehicle control device according to the present invention is a device which is configured to be capable of executing a driving assist for the purpose of assisting a travel control of a host vehicle, comprising a state control unit adapted to perform a state transition control in which there are combined plural types of travel states in accordance with a travel control mode, and plural types of assist states in accordance with a driving assist mode, and a driving control unit adapted to perform a travel control or a notification control according to the state transition control performed by the state control unit, wherein the plural types of travel states include a first travel state, and a second travel state in which a preference of the driver for manual driving is stronger than in the first travel state, the plural types of assist states include a first assist state, and a second assist state in which a level of driving assistance is higher than in the first assist state, and under the second travel state, as compared to being under the first travel state, the state control unit suppresses a transition from the first assist state to the second assist state.

In the manner described above, under the second travel state in which the preference of the driver for manual driving is relatively strong, as compared to being under the first travel state, transitioning from the first assist state to the second assist state in which the level of driving assistance is relatively high is suppressed. Therefore, in the case that the driver has an intention of driving by herself, the driver is capable of taking part in driving the host vehicle (driver's own vehicle) in a mode in which the level of driving assistance is relatively low. Consequently, it is possible to perform a driving assist in which the driving intention of the driver is accurately reflected.

Further, under the second travel state, as compared to being under the first travel state, when suppressing the transition from the first assist state to the second assist state, the driving control unit may suppress a predetermined operation to prompt the transition. By suppressing the predetermined operation to prompt the transition from the first assist state to the second assist state during execution of the second travel state, the driver does not have to be conscious of any transition between the assist states, and can concentrate on the driving operation.

Further, the predetermined operation to prompt the transition may include accepting a transition operation made by the driver in order to transition to the second assist state, or a notification to the effect that transitioning to the second assist state is possible. In accordance with this feature, the driver does not have to be conscious of any transition between the assist states, and can concentrate on the driving operation.

Further, the first assist state may be a state in which transitioning is possible without accepting the transition operation made by the driver, and the second assist state may be a state in which transitioning from the first assist state is possible on the condition that the transition operation made by the driver has been accepted. In accordance with this feature, even without performing a predetermined transition operation, the driver is capable of receiving some kind of driving assist in which the level of assistance is lowered.

The plural types of assist states may include a third assist state in which the level of driving assistance is even higher than in the second assist state, the state control unit may transition to the third assist state in the case that a predetermined condition is satisfied under the second travel state and the first assist state, the driving control unit may perform the driving assist in the third assist state, the state control unit may transition to the first assist state in the case that a predetermined condition is no longer satisfied under the second travel state and the third assist state, and the driving control unit may terminate the driving assist in the third assist state. In accordance with such features, the driver is capable of receiving the driving assist in a timely manner during a period in which the predetermined condition is satisfied.

Further, the driving control unit may be configured to be capable of accepting a transition operation made by the driver in order to transition to the second assist state while maintaining the first travel state, and to be incapable of accepting a transition operation made by the driver in order to transition to the second assist state while maintaining the second travel state. In addition, the state control unit may transition from the second travel state to the first travel state, in the case that, under the second travel state, a transition operation to transition to the second assist state is accepted. In accordance with such features, even in the second travel state, it is possible to transition to a state in which the second assist state is capable of being selected in accordance with a transition operation made by the driver, and the driving intention of the driver to receive driving assistance can be reflected.

Further, upon transitioning between the plural types of travel states, the state control unit may maintain the assist state before and after transitioning. In accordance with this feature, the driver can continuously receive a driving assist of the same mode without being conscious of any transition between the travel states.

According to the present invention, it is possible to perform a driving assist in which the driving intention of the driver is accurately reflected.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a vehicle control device according to the present invention will be presented and described in detail below with reference to the accompanying drawings.

[Configuration of Vehicle Control Device 10]

Figure 1:
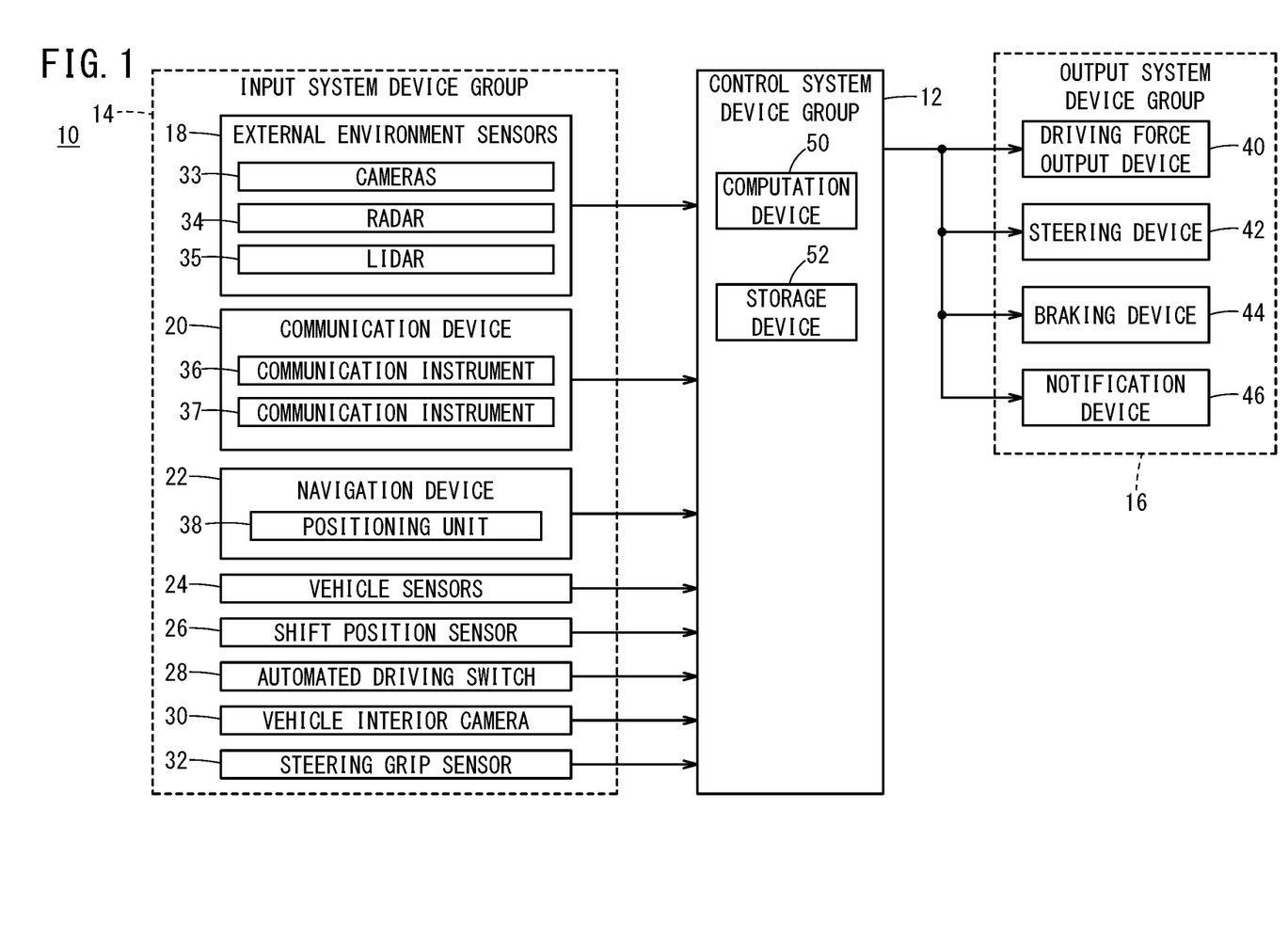
FIG. 1 is a block diagram showing the configuration of a vehicle control device according to an embodiment of the present invention.

FIG. 1 is a block diagram showing the configuration of a vehicle control device 10 according to an embodiment of the present invention.

As shown in FIG. 1, the vehicle control device 10 is incorporated in a vehicle (the vehicle 100 shown in FIGS. 4A and 4B), and implements a travel control for the vehicle by way of automated driving or manual driving. In this instance, the term "automated driving" as used herein implies a concept that includes not only "fully automated driving" in which the travel control for the vehicle is performed entirely automatically, but also "partial automated driving" or "driving assistance" in which the travel control is partially performed automatically.

The vehicle control device 10 is equipped with a control system device group 12 that oversees the travel control for the vehicle, a device group (hereinafter referred to as an input system device group 14) responsible for input functions to the control system device group 12, and a device group (hereinafter referred to as an output system device group 16) responsible for output functions from the control system device group 12.

[2. Specific Configuration of Input System Device Group 14]

In the input system device group 14, there are included external environment sensors 18 that detect a state around the periphery of the vehicle, a communication device 20 which carries out transmission and reception of information to and from various communication devices located externally of the vehicle, a navigation device 22 that generates a travel route to a destination together with measuring a travel position of the vehicle, and vehicle sensors 24 that detect the state of the vehicle.

In the input system device group 14, there are further included a shift position sensor 26 that detects the position of the shift lever, an automated driving switch 28 for instructing the starting and ending of automated driving, a vehicle interior camera 30 that captures images of the driver inside the vehicle, and a steering grip sensor 32 that detects whether or not the driver is grasping the steering wheel.

Among the external environment sensors 18, there are included one or more cameras 33 for capturing images of the external environment (the surrounding periphery of the vehicle 100), one or more radar devices 34 that detect the distance and the relative velocity between the vehicle and other objects, and one or more LIDAR (Light Detection and Ranging/Laser Imaging Detection and Ranging) devices 35.

In the communication device 20, there are included a communication instrument 36 that performs inter-vehicle communications (so-called V2V communications) between the vehicle and other vehicles, and a communication instrument 37 that performs road-to-vehicle communications (so-called V2R communications) between the vehicle and roadside devices.

The navigation device 22 includes a positioning sensor 38 which is capable of measuring the current position of the vehicle, and a non-illustrated user interface (for example, a touch panel display, a speaker, and a microphone). The navigation device 22 calculates a route to a designated destination (a planned travel route for the vehicle) on the basis of the current position of the vehicle or a position designated by the user.

Among the vehicle sensors 24, there are included various sensors for detecting the behavior of the vehicle, such as a vehicle velocity sensor, an acceleration sensor, a yaw rate sensor, an inclination sensor, and the like.

The shift position sensor 26 detects a shift position of a non-illustrated shift lever such as a "D range" and an "S range", and outputs the shift position to the control system device group 12. The shift lever is configured to switch the shift position by a shift-by-wire technique, in accordance with movement of the shift lever in forward and rearward directions by the driver.

The automated driving switch 28, for example, is a button switch provided on a non-illustrated steering wheel or an instrument panel or the like. The automated driving switch 28 is configured to be capable of switching between a manual driving state and an automated driving state, by manual operation thereof by a user including the driver. The automated driving switch 28 outputs switching signals of the manual driving state and the automated driving state to the control system device group 12.

The vehicle interior camera 30 is used to detect a state of the driver, for example, looking away from the road or a failure of the driver. Captured images of the driver are output to the control system device group 12.

In the same manner as the vehicle interior camera 30, the steering grip sensor 32 is used in order to detect a state of a driver, for example, a failure of the driver or releasing of the grip by the driver. The detection result of the steering grip sensor 32 is output to the control system device group 12.

[3. Specific Configuration of Output System Device Group 16]

The output system device group 16 includes a driving force output device 40, a steering device 42, a braking device 44, and a notification device 46.

The driving force output device 40 includes a driving force output ECU (Electronic Control Unit), and a drive source including an engine and/or a driving motor. The driving force output device 40 generates a driving force in accordance with an operation of an accelerator pedal performed by the driver, or a driving control instruction output from the control system device group 12.

The steering device 42 includes an EPS (electric power steering system) ECU, and an EPS actuator. The steering device 42 generates a steering force in accordance with an operation of the steering wheel performed by the driver, or a steering control instruction output from the control system device group 12.

The braking device 44 includes a brake ECU and a brake actuator. The braking device 44 generates a braking force in accordance with an operation of the brake pedal performed by the driver, or a braking control instruction output from the control system device group 12.

The notification device 46 includes a notification ECU, and an information transmission device (a display device, an audio device, a haptic device, etc.). The notification device 46 issues a notification (for example, providing information through the five senses including the senses of seeing and hearing) with respect to the driver in accordance with a notification instruction output from the control system device group 12 or another ECU.

[4. Specific Configuration of Control System Device Group 12]

The control system device group 12 is constituted by one or a plurality of ECUs, and is equipped with a computation device 50 such as a processor, and a storage device 52 such as a ROM and a RAM. The control system device group 12 realizes various functions by the computation device 50 executing programs stored in the storage device 52.

Figure 2:
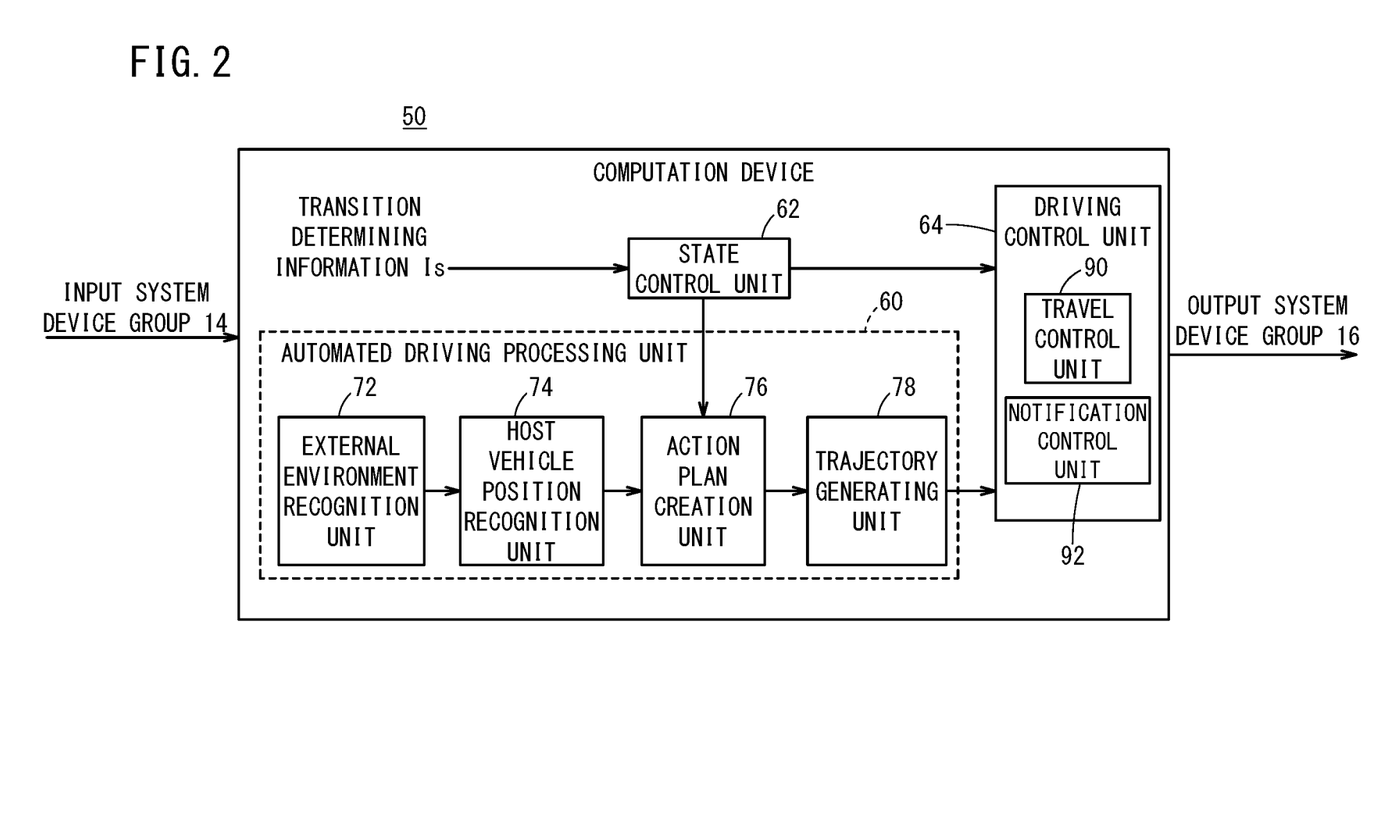
FIG. 2 is a functional block diagram of a computation device shown in FIG. 1.

As shown in FIG. 2, the computation device 50 is configured to be capable of executing various functions of an automated driving processing unit 60, a state control unit 62, and a driving control unit 64, which carry out information processing in relation to automated driving.

The automated driving processing unit 60 is configured to be capable of executing various functions of an external environment recognition unit 72, a host vehicle position recognition unit 74, an action plan creation unit 76, and a trajectory generating unit 78.

On the basis of external environmental information output from the external environment sensors 18 or the communication device 20, the external environment recognition unit 72 recognizes the circumstances and objects in the vicinity around the vehicle.

Based on map information output from the navigation device 22, the host vehicle position recognition unit 74 recognizes the position of the host vehicle (an absolute position of the vehicle, or a relative position on a map).

On the basis of the recognition results from the external environment recognition unit 72 and the host vehicle position recognition unit 74, and mode flags from the state control unit 62, the action plan creation unit 76 creates action plans (a time series of events for each of respective travel segments) according to the situation of the vehicle and the driving intention of the driver. Further, the action plan creation unit 76 updates the content of the action plans as needed.

The trajectory generating unit 78 generates a planned travel trajectory (a time series of target behaviors) in accordance with the action plan created by the action plan creation unit 76. The planned travel trajectory is data indicative of a time series of target vehicle behaviors, and more specifically, is a time series data set, in which the data units thereof are defined by a position, a posture angle, a velocity, an acceleration or deceleration, a curvature, a yaw rate, and a steering angle.

The state control unit 62 performs a state transition control in which plural types of travel modes and plural types of assist states are combined, on the basis of information Is (hereinafter referred to as transition determining information Is) necessary for determining the state transition. More specifically, mode flags associated with the travel modes and the assist states are output to the action plan creation unit 76 and the driving control unit 64.

In the transition determining information Is used by the state control unit 62, there are included a shift position ("D range"/"S range") of the shift lever which is output from the shift position sensor 26, and an automated driving start request or an automated driving end request (an ON/OFF state of the automated driving switch 28). Further, there are also included the state of the driver (for example, a failure of the driver) which is detected by the vehicle interior camera 30 and the steering grip sensor 32, and an operative state of the computation device 50 (a failure of the computation device 50, the presence or absence of a malfunction, etc.).

The term "travel mode" implies a mode associated with a travel control mode for the vehicle (for example, a shift position of the shift lever), and the term "assist state" implies a mode associated with an assist mode of the travel control (for example, an ON/OFF condition of the automated driving switch 28).

As "travel mode" types in which the state control unit 62 carries out the transition control, there may be cited, for example, a "normal travel mode (first travel state)" corresponding to the "D range" of the shift lever, and a "sports mode (second travel state)" corresponding to the "S range" of the shift lever. The "sports mode" is a mode in which a preference of the driver for manual driving is stronger than in the "normal travel mode", and is a mode for the purpose of obtaining a strong travel performance in which the vehicle's ability to accelerate in relation to operations of the non-illustrated accelerator pedal is high.

As "assist state" types in which the state control unit 62 carries out the transition control, there may be cited, for example, a "manual driving state (first assist state)", a "normal automated driving state (second assist state)" in which the level of driving assistance is higher than in the manual driving state, and a "crisis avoidance automated driving state (third assist state)" in which the level of driving assistance is even higher than in the normal automated driving state.

The "manual driving state" is a state in which the automated driving switch 28 is turned OFF, and the driver manually operates the vehicle 100.

The "normal automated driving state" is a state in which the automated driving switch 28 is turned ON, and the vehicle 100 automatically performs a portion or all of the travel controls for the vehicle 100 at a normal time. In the present embodiment, in the "normal automated driving state", a state is assumed in which a need may arise for the external environment (the periphery around the vehicle 100) to be monitored by the driver, or for the vehicle 100 to be operated by the driver.

In the "normal automated driving state", for example, an ACC (adaptive cruise control) function to follow a preceding vehicle while appropriately maintaining a distance (inter-vehicle distance) between the vehicles, and an LKAS (Lane Keeping Assist System) function in which a steering operation is controlled in a manner so that the vehicle travels substantially in the center of the travel lane are executed. Further, in addition to the ACC function and the LKAS function, a TJA (Traffic Jam Assist) function in which a low speed leading vehicle is followed at a time of traffic congestion, and an ALC (Auto Lane Changing) function to automatically change lanes are executed.

The "crisis avoidance automated driving state" is a state in which the automated driving switch 28 is turned ON or OFF, and the vehicle 100 automatically performs a portion or all of the travel controls in order to avoid a crisis during an emergency situation. In the present embodiment, in the "crisis avoidance automated driving state", a state is assumed in which monitoring of the external environment (the periphery around the vehicle 100) by the driver, or operating of the vehicle 100 by the driver is not required (the driver does not and cannot perform monitoring of the external environment or operation of the vehicle).

In the "crisis avoidance automated driving state", for example, an automatic braking function (Collision Mitigation Brake System, hereinafter referred to as a CMBS function) for avoiding a collision with an object in an emergency situation, and a function to mitigate against departure from the road (Road Departure Mitigation, hereinafter referred to as an RDM function) for preventing departure from a traveling lane are executed. Further, in addition to the CMBS function and the RDM function, a blind spot detection function (Blind Spot Information, hereinafter referred to as a BSI function) for detecting other vehicles alongside and on a rearward side of the vehicle and to notify the driver, and a lane watching (Lane Watch) function to display an image of the lane on the side of the passenger, which tends to be a blind spot, and to inform the driver of the existence of other vehicles, etc., are executed.

Moreover, the "normal automated driving state" and the "crisis avoidance automated driving state" may be further subdivided into two or more different types of states in which the level of driving assistance differs in a stepwise manner.

Further, according to the present embodiment, the state control unit 62 performs the state transition control by associating the "travel state" and the "assist state" with each other in a multiple-to-multiple relationship using the mode flags. However, a control method apart therefrom may be adopted. For example, the state control unit 62 may associate the "travel state" and the "assist state" with each other in a one-to-multiple, a multiple-to-one, or a multiple-to-multiple relationship.

The driving control unit 64 issues an instruction with respect to the output system device group 16 (see FIG. 1), on the basis of the processing results of the automated driving processing unit 60, and the mode flags from the state control unit 62. The driving control unit 64 includes a travel control unit 90 that carries out a travel control for the vehicle, and a notification control unit 92 that performs a notification control with respect to the driver.

[5. Operations of Vehicle Control Device 10]

The vehicle control device 10 according to the present embodiment is configured basically in the manner described above. Next, operations of the vehicle control device 10 will be described with reference to FIGS. 3 through 4B.

[6. State Transition Control by State Control Unit 62]

Figure 3:
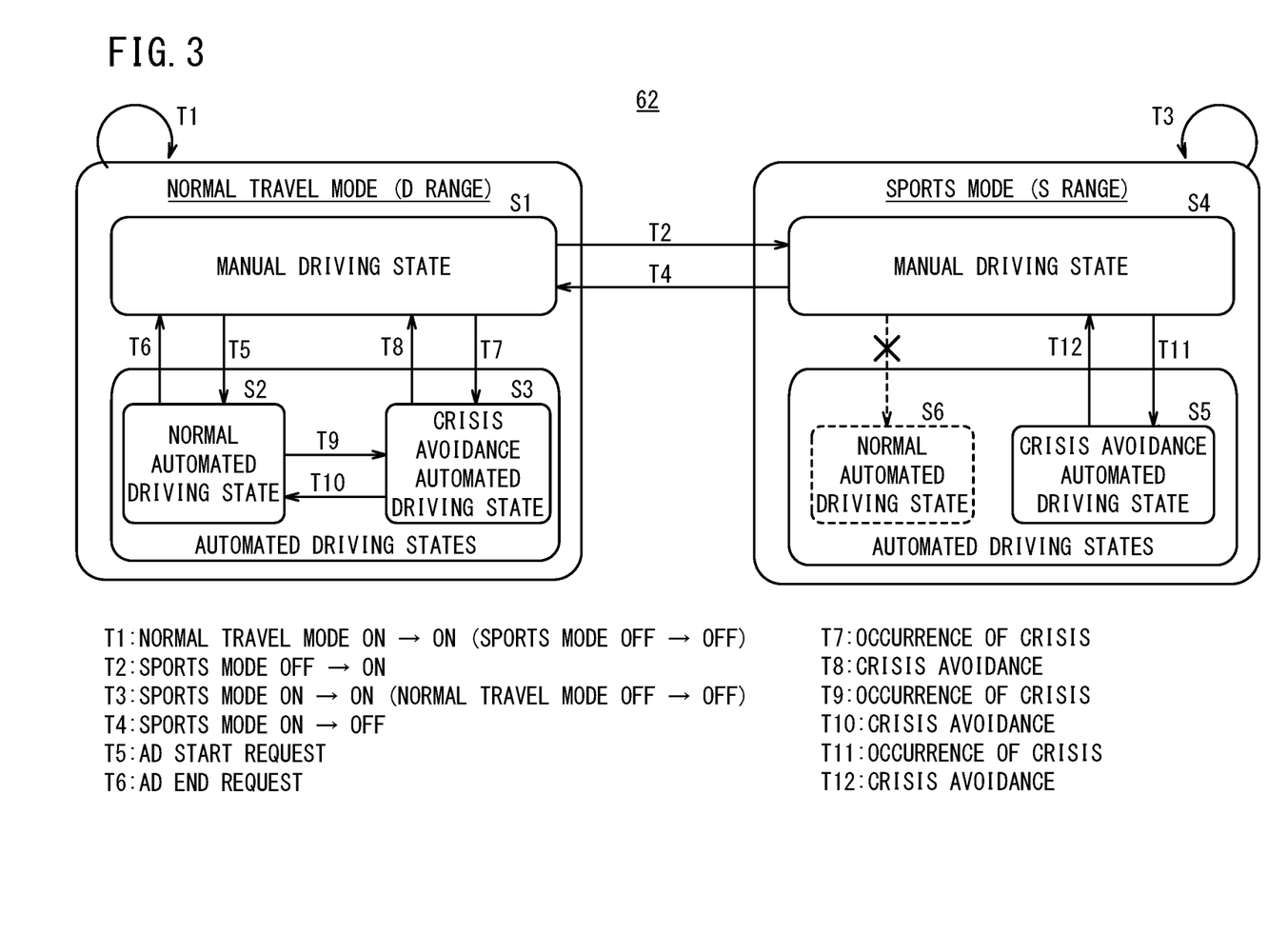
FIG. 3 is a state transition diagram showing a state transition control performed by a state control unit shown in FIG. 2.
Figure 4A:
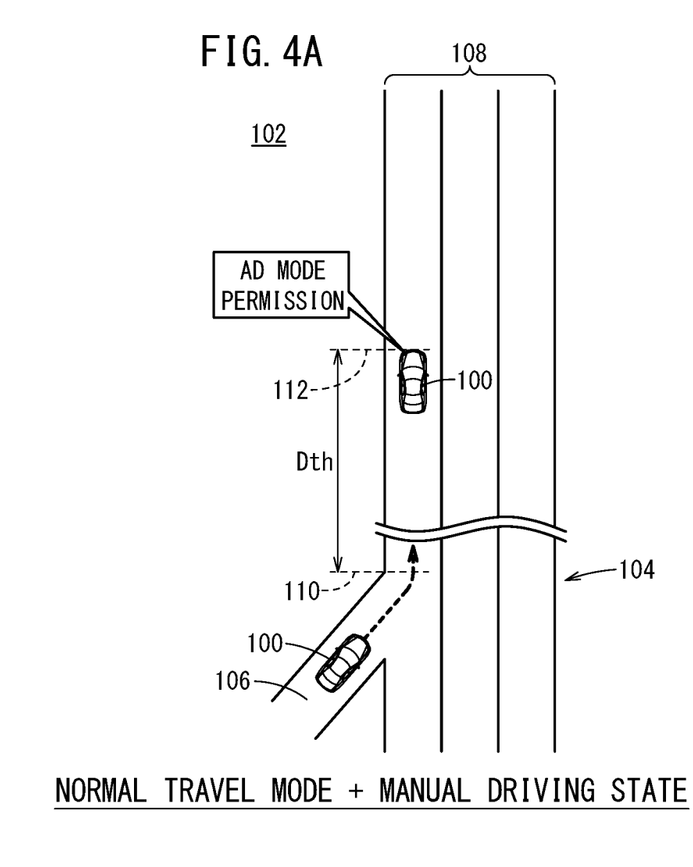
FIG. 4A is a diagram showing an example of operations of a driving control unit at a time that a normal travel mode is executed.

FIG. 3 is a state transition diagram showing a state transition control performed by the state control unit 62 shown in FIG. 2. The state control unit 62 performs a state transition control in which two types of travel modes and three types of assist states are combined.

Referring to FIG. 3, a transition control between two types of travel modes, i.e., a normal travel mode (a travel mode under the "D range") and a sports mode (a travel mode under the "S range") will be described.

Under a state in which the automated driving switch 28 is OFF, the state control unit 62 causes the travel mode to transition to the "normal travel mode", for example, in accordance with an operation of the shift lever to change the shift position from the "P range" or the "N range" to the "D range". While the shift position is in the "D range", the normal travel mode is ON (sports mode OFF), and the normal travel mode is kept as it is without modification (transition line T1).

Next, the state control unit 62 causes the travel mode to transition from the "normal travel mode" to the "sports mode", in accordance with an operation of the shift lever to change the shift position from the "D range" to the "S range" (transition line T2). While the shift position is in the "S range", the sports mode is ON (normal travel mode OFF), and the sports mode is kept as it is without modification (transition line T3).

Furthermore, the state control unit 62 causes the travel mode to transition from the "sports mode" to the "normal travel mode", in accordance with an operation of the shift lever to change the shift position from the "S range" to the "D range" (transition line T4).

In this manner, the state control unit 62 performs the transition control to transition between the travel modes (the "normal travel mode" or the "sports mode") depending on the shift position ("D range" or "S range") of the shift lever.

Next, a description will be given concerning a transition control between assist states when the travel mode is the normal travel mode (shift position: "D range"). In this instance, the description will be made assuming a condition in which the shift position is in the "D range" and the automated driving switch 28 is turned OFF, or stated otherwise, with the "manual driving state S1" in FIG. 3 being set as an initial state.

First, when the state control unit 62 accepts an ON operation (automated driving switch 28: OFF→ON) of the automated driving switch 28 made by the driver as a trigger, then as indicated by the transition line T5, a transition is made from the manual driving state S1 to the normal automated driving state S2 in which the travel control for the vehicle is automatically performed at a normal time. Hereinafter, the ON operation of the automated driving switch 28 made by the driver may be referred to as an "automated driving start request" or an "AD (Automated Driving) start request".

In the normal automated driving state S2, when the state control unit 62 accepts an OFF operation (automated driving switch 28: ON→OFF) of the automated driving switch 28 made by the driver as a trigger, then as indicated by the transition line T6, a transition is made from the normal automated driving state S2 to the manual driving state S1. Hereinafter, the OFF operation of the automated driving switch 28 made by the driver may be referred to as an "automated driving end request" or an "AD end request".

In the manual driving state S1, in the case that a predetermined condition is established indicating the occurrence of a crisis situation, such as a failure of the driver or the like, then as indicated by the transition line T7, the state control unit 62 automatically transitions from the manual driving state S1 to the crisis avoidance automated driving state S3 in which a travel control is implemented in order to avoid a crisis during an emergency situation.

In this instance, for the predetermined condition (hereinafter referred to as a "crisis recognition condition") which indicates the occurrence of a crisis situation, there may be cited, for example, [1] the detection of an abnormality in the state of the driver such as a failure of the driver, a continuous looking away or lack of awareness of the driver, or releasing of the grip from the steering wheel or the like, and [2] the detection of a failure, or a functional defect or the like of the control system device group 12 including the computation device 50.

In the crisis avoidance automated driving state S3, in the case that a predetermined condition is established which indicates the elimination of the crisis situation, then as indicated by the transition line T8, the state control unit 62 automatically transitions to the state prior to the occurrence of the crisis situation (in this instance, the manual driving state S1).

The predetermined condition (hereinafter referred to as a "crisis cancellation condition") which indicates the elimination of the crisis situation, for example, is a negative condition (a so-called NOT condition) of the aforementioned crisis recognition condition, and as examples thereof, there may be cited [1] that the state of the driver has returned to a normal state, and [2] that the failure or malfunctioning of the control system device group 12 including the computation device 50 has been restored to a normal state.

Further, even in the case that the aforementioned crisis recognition condition has been established under the normal automated driving state S2 in which the travel control for the vehicle is performed automatically at a normal time, as indicated by the transition line T9, the state control unit 62 automatically transitions from the normal automated driving state S2 to the crisis avoidance automated driving state S3.

After having transitioned from the normal automated driving state S2 to the crisis avoidance automated driving state S3, in the case that the aforementioned crisis cancellation condition is established, then as indicated by the transition line T10, the state control unit 62 automatically transitions to the state prior to the occurrence of the crisis situation (in this instance, the automated driving state S2).

In the foregoing manner, when the travel mode is the "normal travel mode" (shift position: "D range"), the state control unit 62 performs a transition control between the manual driving state S1 and the normal automated driving state S'on the basis of the AD start request (automated driving switch 28: OFF→ON) or the AD end request (automated driving switch 28: ON→OFF) made by the driver.

Further, when the travel mode is the "normal travel mode" (shift position: "D range"), and taking as a condition that the "crisis recognition condition" or the "crisis cancellation condition" is established, the state control unit 62 performs a transition control automatically between the manual driving state S1 and the crisis avoidance automated driving state S3, and between the normal automated driving state S2 and the crisis avoidance automated driving state S3.

Next, a description will be given concerning a transition control between assist states when the travel mode is the "sports mode" (shift position: "S range"). In this instance, the description will be made assuming a condition in which the shift position is in the "S range" and the automated driving switch 28 is turned OFF, or stated otherwise, with the "manual driving state S4" in FIG. 3 being set as an initial state.

First, in the manual driving state S4, in the case that a predetermined condition (the aforementioned "crisis recognition condition") is established indicating the occurrence of a crisis situation, such as a failure of the driver or the like, then as indicated by the transition line T11, the state control unit 62 automatically transitions from the manual driving state S4 to the crisis avoidance automated driving state S5 in which a travel control is implemented in order to avoid a crisis during an emergency situation.

In the crisis avoidance automated driving state S5, in the case that a predetermined condition (the aforementioned "crisis cancellation condition") is established which indicates the elimination of the crisis situation, then as indicated by the transition line T12, the state control unit 62 automatically transitions to the state prior to the occurrence of the crisis situation (in this instance, the manual driving state S4).

In the foregoing manner, in the case that a predetermined condition is satisfied during execution of the sports mode (shift position: "S range") and the manual driving state S4 (automated driving switch 28: OFF) (in the case that the "crisis recognition condition" is established), the state control unit 62 automatically transitions from the manual driving state S4 to the crisis avoidance automated driving state S5. On the other hand, in the case that the predetermined condition is no longer satisfied (in the case that the crisis cancellation condition is established), the various functions executed in the crisis avoidance automated driving state S5 are terminated, and the state control unit 62 transitions to (restores) the manual driving state S4.

More specifically, in the case that a predetermined crisis recognition condition is satisfied during execution of the sports mode and the manual driving state S4, a transition is made automatically to the crisis avoidance automated driving state S5, and the driving control unit 64 performs various driving assist functions by the CMBS function and the like, which are capable of being executed in the crisis avoidance automated driving state S5. On the other hand, in the case that the predetermined condition is no longer satisfied, a transition (restoration) is made automatically from the crisis avoidance automated driving state S5 to the manual driving state S4, and the driving control unit 64 terminates the various driving assist functions by the CMBS function and the like, which are capable of being executed in the crisis avoidance automated driving state S5.

Incidentally, in the sports mode (shift position: "S range") and the manual driving state S4 (automated driving switch 28: OFF), in the case that the AD start request (automated driving switch 28: OFF→ON) is made by the driver, the state control unit 62 does not accept the AD start request. Stated otherwise, in the case that the AD start request is made by the driver, the state control unit 62 suppresses (restricts or prohibits) transitioning from the manual driving state S4 to the "normal automated driving state S6" in which a portion or all of the travel controls for the vehicle are performed automatically at a normal time.

Stated otherwise, during execution of the sports mode (shift position: "S range"), as compared to being in the normal travel mode, the state control unit 62 suppresses (restricts or prohibits) the transition from the manual driving state S4 to the normal automated driving state S6. Consequently, in the case that the driver has an intention of driving by herself, the driver is capable of taking part in driving the vehicle in a mode in which the level of driving assistance is relatively low, and a driving assist can be executed in which the driving intention of the driver is accurately reflected.

Moreover, in principle, the state control unit 62 is capable of independently transitioning between the travel modes and the assist states, and upon transitioning between the plural types of travel modes, maintains the assist state before and after transitioning. In accordance with this feature, the driver can continuously receive a driving assist of the same mode without being conscious of any transition between the travel modes.

In this instance, the manual driving states S1 and S4 are states which are capable of being transitioned to without acceptance of a transition operation made by the driver. On the other hand, the normal automated driving state S2, in which the travel control for the vehicle is automatically performed at a normal time, is a state that is capable of being transitioned to from the manual driving state S1, on the condition that a transition operation made by the driver (the AD start request) has been accepted. Further, the crisis avoidance automated driving states S3 and S5, by which the travel control is automatically performed in order to avoid a crisis during an emergency situation, are states that are capable of being transitioned to automatically in the case that a crisis recognition condition is established.

In the foregoing manner, even if the driver does not perform a transition operation under the manual driving states S1 and S4, a transition is made to the crisis avoidance automated driving state S3 or S5 on the condition that the crisis recognition condition has been established. Consequently, under the sports mode and under the manual driving state S4, while transitioning to the normal automated driving state S6 is suppressed (restricted or prohibited), the CMBS function and the like for avoiding a crisis, and the provision of various driving assist functions can be received.

[7. Operation to Prompt a Mode Transition by the Driving Control Unit 64]

Figure 4B:
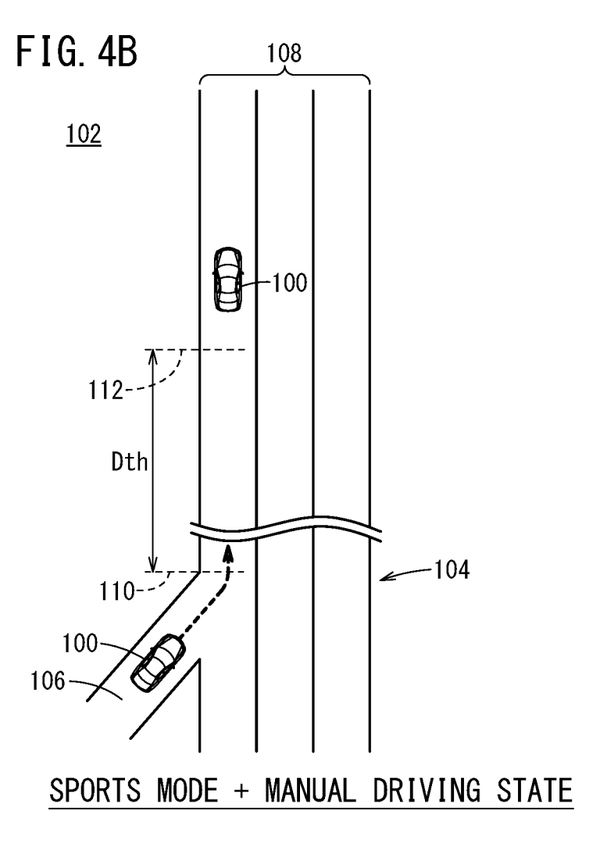
FIG. 4B is a diagram showing an example of operations of the driving control unit at a time that a sports mode is executed.

FIG. 4A is a diagram showing an example of operations of the driving control unit 64 at a time that the normal travel mode is executed. FIG. 4B is a diagram showing an example of operations of the driving control unit 64 at a time that the sports mode is executed.

The vehicle 100 attempts to pass through a merging point 104 of an expressway 102 along the planned travel route indicated by the dashed line arrow. The expressway 102 is composed of a merging lane 106 having one lane, and a main line roadway 108 having three lanes. In the present drawing, a road is illustrated for a country or region where it has been decided that automobiles are to travel "on the left side" of the road.

In the example of FIG. 4A, a case is assumed in which the vehicle control device 10 is executing a combination of the normal travel mode (shift position: "D range") and the manual driving state S1 (automated driving switch 28: OFF). After having started to travel on the main line roadway 108, it is assumed that the vehicle 100 has arrived at a predetermined position (hereinafter referred to as a notification start position 112) in a forward direction from a reference position 110 of the merging point 104 by a distance threshold Dth.

Upon doing so, the driving control unit 64 performs a predetermined operation to prompt the transition from the manual driving state S1 to the normal automated driving state S2. For example, the notification control unit 92 instructs the notification device 46 to issue a notification to the effect that the normal automated driving state S2 is possible. The driver performs a predetermined transition operation (an AD start request, an operation to turn ON the automated driving switch 28) with the notification by the notification device 46 acting as a trigger. Consequently, after having accepted the transition operation made by the driver, the state control unit 62 performs a state transition control to transition from the manual driving state S1 to the normal automated driving state S2.

In the example of FIG. 4B, a case is assumed in which the vehicle control device 10 is executing a combination of the sports mode (shift position: "S range") and the manual driving state S4 (automated driving switch 28: OFF). After having started to travel on the main line roadway 108, it is assumed that the vehicle 100 has arrived at a predetermined position (the notification start position 112) in a forward direction from a reference position 110 of the merging point 104 by the distance threshold Dth.

However, unlike the case of the normal travel mode, the driving control unit 64 suppresses the predetermined operation to prompt the transition from the manual driving state S4 to the normal automated driving state S6. For example, the driving control unit 64 may prohibit the acceptance of a transition operation made by the driver (an AD start request, an operation to turn ON the automated driving switch 28 made by the driver), or may prohibit execution of a notification to the effect that transitioning to the normal automated driving state S6 is possible, so that the notification device 46 does not issue such a notification to the effect that transitioning to the normal automated driving state S6 is possible. In accordance with this feature, the driver does not have to be conscious of any transition between the assist states, and can concentrate on the driving operation.

It should be noted that, although FIGS. 4A and 4B illustrate travel scenarios on an expressway 102, the above-described operations of the driving control unit 64 can also be applied when the vehicle 100 is traveling on a general road.

For example, a case is assumed in which the vehicle 100 passes through an intersection in the manual driving state S1 or S4, and has traveled a predetermined distance (the distance threshold Dth) from the position of the intersection.

In the case that the vehicle 100 has arrived at the notification start position 112 in a forward direction from the intersection by the distance threshold Dth, when in the normal travel mode and the manual driving state S1, a notification is issued to prompt a transition to the normal automated driving state S2. On the other hand, when in the sports mode and the manual driving state S4, execution of the notification to prompt the transition to the normal automated driving state S6 is prohibited. In accordance with this feature, the driver does not have to be conscious of any transition between the assist states, and can concentrate on the driving operation.

[8. Summary of Embodiment]

As described above, the vehicle control device 10 is [1] a device that is configured to be capable of executing a driving assist for the purpose of assisting a travel control for the host vehicle 100, and is equipped with [2] the state control unit

62 that performs a state transition control in which there are combined plural types of travel states (the normal travel mode and the sports mode) in accordance with a travel control mode, and plural types of assist states (the manual driving states S1 and S4, the normal automated driving states S2 and S6, the crisis avoidance automated driving states S3 and S5) in accordance with a driving assist mode, and [3] the driving control unit 64 that performs a travel control or a notification control according to the state transition control performed by the state control unit 62.

Further, in a vehicle control method, [1] the vehicle control device 10 (one or a plurality of computers) is configured to be capable of executing a driving assist for the purpose of assisting a travel control for the vehicle 100, and executes [2] a step of performing a state transition control in which there are combined plural types of travel states (the normal travel mode and the sports mode) in accordance with a travel control mode, and plural types of assist states (the manual driving states S1 and S4, the normal automated driving states S2 and S6, the crisis avoidance automated driving states S3 and S5) in accordance with a driving assist mode, and [3] a step of performing a travel control or a notification control according to the state transition control.

In addition, [4] the plural types of travel states include the first travel state (normal travel mode), and the second travel state (sports mode) in which a preference of the driver for manual driving is stronger than in the normal travel mode, [5] the plural types of assist states include the first assist state (the manual driving states S1 and S4), and the second assist state (the normal automated driving states S2 and S6) in which a level of driving assistance is higher than in the first assist state (the manual driving states S1 and S4), and [6] under the second travel state (sports mode), as compared to being under the first travel state (normal travel mode), the state control unit 62 suppresses a transition from the first assist state (the manual driving state S4) to the second assist state (the normal automated driving state S6).

In the forgoing manner, under the second travel state (sports mode) in which the preference of the driver for manual driving is relatively strong, as compared to being under the first travel state (normal travel mode), transitioning to the second assist state (normal automated driving state S6) in which the level of driving assistance is relatively high is suppressed. Therefore, in the case that the driver has an intention of driving by herself, the driver is capable of taking part in driving the host vehicle 100 in a mode in which the level of driving assistance is relatively low. Consequently, it is possible to perform a driving assist in which the driving intention of the driver is accurately reflected.

[9. Supplemental Considerations]

Incidentally, in the embodiment described above, accompanying the execution of the state transition control, the driving control unit 64 is capable of accepting a transition operation (the AD start request) made by the driver in order to transition to the normal automated driving state S2 while maintaining the normal travel mode. On the other hand, the driving control unit 64 is configured to be incapable of accepting such a transition operation (the AD start request) made by the driver in order to transition to the normal automated driving state S6 while maintaining the sports mode.

In this case, in an exceptional manner, the state control unit 62 may be capable of transitioning between the driving modes and the assist states in an interlocked fashion.

Figure 5:
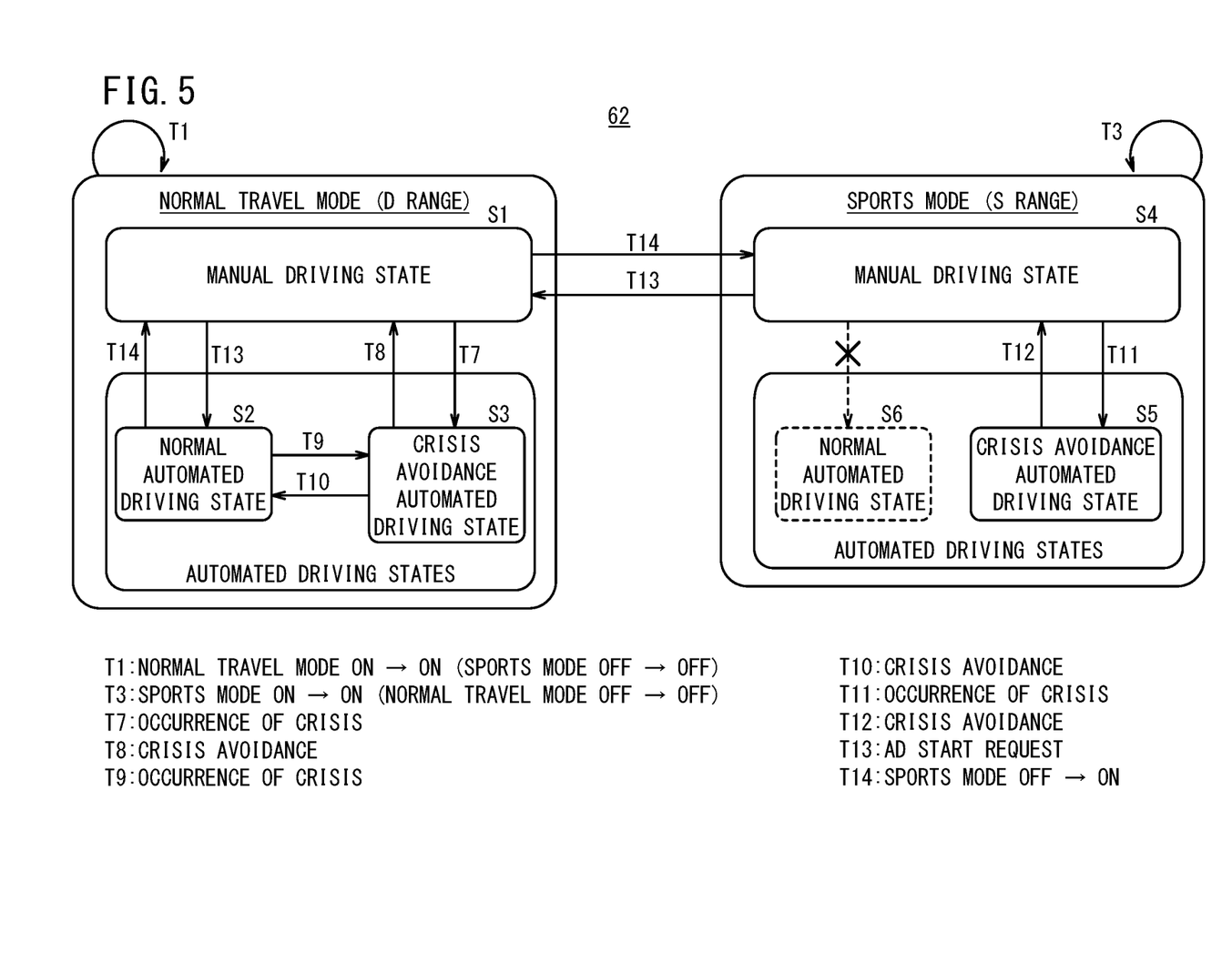
FIG. 5 is a state transition diagram showing a state transition control performed by the state control unit shown in FIG. 2.

For example, as shown in FIG. 5, it is assumed that the driver has performed the ON operation (the AD start request) of the automated driving switch 28 during execution of the sports mode and the manual driving state S4.

Upon doing so, as indicated by the transition line T13, the state control unit 62 automatically transitions from the sports mode to the normal travel mode (manual driving state S4→manual driving state S1), while maintaining the manual driving state as it existed prior to formal acceptance of the AD start request made by the driver. Immediately thereafter, the state control unit 62 formally accepts the AD start request, and transitions from the manual driving state S1 to the normal automated driving state S2.

In the foregoing manner, in the case that the state control unit 62 has received the ON operation (the AD start request) of the automated driving switch 28 during execution of the sports mode and the manual driving state S4, the state control unit 62 [1] may transition from the sports mode (and the manual driving state S4) to the normal travel mode (and the manual driving state S1), even if the driver does not move the shift lever from the "S range" to the "D range", and next, [2] may sequentially transition from the manual driving state S1 to the normal automated driving state S2.

Consequently, even during execution of the sports mode and the manual driving state S4, it is possible to transition to a state in which the normal automated driving state S2 is capable of being selected in accordance with a transition operation made by the driver, and the driving intention of the driver to receive driving assistance can be accurately reflected.

Further, as shown in FIG. 5, it is assumed that the driver has operated the shift lever position from the "D range" to the "S range" during execution of the normal travel mode and the normal automated driving state S2.

Upon doing so, as indicated by the transition line 114, prior to formal reception of the shift lever operation made by the driver, the state control unit 62 automatically transitions from the normal automated driving state S2 to the manual driving state S1 while the travel mode is kept as it is in the normal travel mode. Immediately thereafter, the state control unit 62 formally accepts the shift lever operation made by the driver (shift position "D range"→"S range", sports mode OFF→ON), and transitions from the normal travel mode and the manual driving state S1 to the sports mode and the manual driving state S4.

Consequently, the driving intention of the driver to derive pleasure from driving can be accurately reflected.

Moreover, in the above-described embodiment, an example has been illustrated of setting the driving assist function, such as the CMBS function, the RDM function, or the like in order to avoid a crisis situation, to ON at all times, regardless of the travel mode (the normal travel mode or the sports mode). However, depending on the combination of the travel mode and the assist mode, it is not necessary for a portion of the automated driving functions for the purpose of avoiding a crisis situation to be set to ON at all times.

For example, as in the BSI function and the lane watch function, concerning functions that merely inform the driver of circumstances in the vicinity of the vehicle 100, in the case of automatically transitioning from the normal travel mode and the normal automated driving state S2 to the crisis avoidance automated driving state S3, such functions may be set to OFF.

Consequently, in the crisis avoidance automated driving state S3, it is possible to receive only notifications (warnings) which are not accompanied by vehicle controls, and to avoid falling into a situation in which the driver does not understand what action should be taken.

In the foregoing manner, the present invention is not limited to the embodiment described above, and it goes without saying that the present invention can be freely modified within a range that does not depart from the essence and gist of the present invention. Alternatively, the respective configurations may be combined arbitrarily within a range in which no technical inconsistencies occur.

What is claimed is:

1. A vehicle control device which is configured to be capable of executing a driving assist for the purpose of assisting a travel control of a host vehicle, the vehicle control device comprising one or more processors that execute computer-executable instructions stored on a memory, wherein execution of the computer-executable instructions by the one or more processors cause the vehicle control device to:
   perform a state transition control in which there are combined plural types of travel states in accordance with a travel control mode, and plural types of assist states in accordance with a driving assist mode; and
   perform a travel control or a notification control according to the state transition control;
   wherein the plural types of travel states include a first travel state, and a second travel state in which ability of the host vehicle to accelerate in relation to an operation of an accelerator pedal is higher than in the first travel state;
   the plural types of assist states include a first assist state, and a second assist state in which a level of driving assistance is higher than in the first assist state; and
   under the second travel state, as compared to being under the first travel state, the one or more processors cause the vehicle control device to suppresses a transition from the first assist state to the second assist state.

2. The vehicle control device according to claim 1, wherein under the second travel state, as compared to being under the first travel state, when suppressing the transition from the first assist state to the second assist state, the one or more processors cause the vehicle control device to suppresses a predetermined operation that prompts the transition.

3. The vehicle control device according to claim 2, wherein the predetermined operation that prompts the transition comprises accepting a transition operation made by the driver in order to transition to the second assist state, or a notification to the effect that transitioning to the second assist state is possible.

4. The vehicle control device according to claim 1, wherein:
   the plural types of assist states include a third assist state in which the level of driving assistance is even higher than in the second assist state;
   the one or more processors cause the vehicle control device to transition to the third assist state, in the case that a predetermined condition is satisfied under the second travel state and the first assist state;
   the one or more processors cause the vehicle control device to perform the driving assist in the third assist state;
   the one or more processors cause the vehicle control device to transition to the first assist state, in the case that a predetermined condition is no longer satisfied under the second travel state and the third assist state; and
   the one or more processors cause the vehicle control device to terminate the driving assist in the third assist state.

5. The vehicle control device according to claim 1, wherein:
   the one or more processors cause the vehicle control device to accept a transition operation made by the driver in order to transition to the second assist state while maintaining the first travel state, and not accept a transition operation made by the driver in order to transition to the second assist state while maintaining the second travel state; and
   the one or more processors cause the vehicle control device to transition from the second travel state to the first travel state, in the case that, under the second travel state, a transition operation to transition to the second assist state is accepted.

6. The vehicle control device according to claim 5, wherein, upon transitioning between the plural types of travel states, the one or more processors cause the vehicle control device to maintains the assist state before and after transitioning.

7. The vehicle control device according to claim 4, wherein:
   the one or more processors cause the vehicle control device to transition to the third assist state, in the case that a predetermined condition is satisfied under the first travel state and the second assist state;
   the one or more processors cause the vehicle control device to transition to the second assist state, in the case that a predetermined condition is no longer satisfied under the first travel state and the third assist state; and
   when the driving assist in the third assist state is performed, the one or more processors cause the vehicle control device to suppress an operation to notify the driver of circumstances around the periphery of the vehicle which are not accompanied by a travel control for the vehicle.

8. The vehicle control device according to claim 4, wherein the first assist state is a state in which transition to the third assist state is possible without accepting a transition operation made by the driver; and
   wherein it is possible, on the condition that the transition operation made by the driver has been accepted, to switch between the first assist state and the second assist state.

* * * * *

UNITED STATES PATENT AND TRADEMARK OFFICE
CERTIFICATE OF CORRECTION

PATENT NO. : 11,106,204 B2
APPLICATION NO. : 16/289912
DATED : August 31, 2021
INVENTOR(S) : Toshiyuki Kaji and Yoshifumi Nakamura Page 1 of 1

It is certified that error appears in the above-identified patent and that said Letters Patent is hereby corrected as shown below:

In the Claims

Column 15:
Line 33, change "suppresses" to -- suppress --
Line 40, change "suppresses" to -- suppress --

Column 16:
Line 30, change "maintains" to -- maintain --

Signed and Sealed this
Ninth Day of November, 2021

Drew Hirshfeld
*Performing the Functions and Duties of the
Under Secretary of Commerce for Intellectual Property and
Director of the United States Patent and Trademark Office*